(12) United States Patent
Chen et al.

(10) Patent No.: US 7,755,981 B2
(45) Date of Patent: Jul. 13, 2010

(54) METHOD AND SYSTEM FOR RECORDING DATA BY A PLURALITY OF LASER BEAMS ON AN OPTICAL DISC

(75) Inventors: Dayu Chen, Shanghai (CN); Henk Goossens, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 46 days.

(21) Appl. No.: 12/093,960

(22) PCT Filed: Nov. 14, 2006

(86) PCT No.: PCT/IB2006/054230

§ 371 (c)(1),
(2), (4) Date: May 16, 2008

(87) PCT Pub. No.: WO2007/057836

PCT Pub. Date: May 24, 2007

(65) Prior Publication Data

US 2008/0253268 A1   Oct. 16, 2008

(30) Foreign Application Priority Data

Nov. 17, 2005   (CN) ................... 2005 1 0125494

(51) Int. Cl.
*G11B 21/08* (2006.01)
(52) U.S. Cl. .................................. 369/30.03
(58) Field of Classification Search .................. None
See application file for complete search history.

(56) References Cited

U.S. PATENT DOCUMENTS

| | | | |
|---|---|---|---|
| 5,457,670 A * | 10/1995 | Maeda et al. ............ 369/44.28 |
| 5,572,493 A | 11/1996 | Maeda et al. |
| 5,933,410 A * | 8/1999 | Nakane et al. ............ 369/275.3 |
| 2003/0043722 A1 | 3/2003 | Fumoto et al. |
| 2004/0202071 A1 | 10/2004 | Pang et al. |
| 2005/0047309 A1 * | 3/2005 | Terao et al. ................. 369/108 |

FOREIGN PATENT DOCUMENTS

EP   1023721 B1   8/2000

OTHER PUBLICATIONS

International Search Report of International Application No. PCT/IB2006/054230 Contained In International Publication No. WO2007057836.
Written Opinion of the International Searching Authority for International Application No. PCT/IB2006/054230.

* cited by examiner

*Primary Examiner*—Joseph H Feild
*Assistant Examiner*—Henok G Heyi

(57) ABSTRACT

The invention relates to a method and system for recording data by a plurality of laser beams (A, B) on an optical disc, said optical disc comprising segments which (1-51) are each identified by a synchronization pattern, said plurality of laser beams comprising at least a first laser beam (A) which has a first position on said optical disc for recording/reading data on a first segment and a second laser beam (B) which has a second position on said optical disc for recording data on a second segment, said method comprising the steps of: —calculating (410) said second position from said first position and the relative distance between said first laser beam and said second laser beam, —detecting (420) a synchronization pattern by said second laser beam, and —starting (430) to record data with said second laser beam on the basis of said second position and said detected synchronization pattern.

5 Claims, 5 Drawing Sheets

METHOD AND SYSTEM FOR RECORDING DATA BY A PLURALITY OF LASER BEAMS ON AN OPTICAL DISC

FIELD OF THE INVENTION

The invention relates to a method and system for recording data by a plurality of laser beams on an optical disc.

BACKGROUND OF THE INVENTION

With the development of optical storage solutions and the increasing data capacity of the optical discs, such as VCD (video compact disc), DVD (digital versatile disc), or BD (Blu-ray disc), the speed of recording data on said optical discs has become a key factor.

Some techniques are known for recording data on an optical disc at high speed, in particular techniques using a plurality of laser beams that record data in parallel. Such techniques propose that the plurality of laser beams are controlled so as to simultaneously record data on an optical disc, then simultaneously shift to a next position after said plurality of laser beams has rotated by a pre-defined angle, such as a multiple of 360°.

These known techniques have some major limitations. Indeed, when the plurality of laser beams is shifted by said pre-defined angle, the new data sequence to be recorded by each laser beam is likely to be located inside a data segment (pre-defined on an optical disc). This implies that the laser beams must be controlled with a high precision of less than a channel bit length for linking consecutive data sequences to be recorded. Reaching this high precision is not only difficult to achieve, but also expensive. Moreover, if this high precision is not reached, consecutively recorded data sequences cannot be linked continuously, leading to recording errors because of overlap in data sequence data, and/or to data lost.

However, recording data on an optical disc from a start of a segment requires a lower precision, e.g. just control of a laser pulse of a laser beam at the scale of a wobble wavelength. In this case, it is necessary to detect the start of segments (pre-defined in the spiral of an optical disc) to start recording data on an optical disc, so as to seamlessly link the data sequence recorded by a laser beam and a subsequent data sequence recorded by a next laser beam.

Many conventional, known methods of detecting the start of segments are only based on pre-groove information in spiral tracks of an optical disc. But using only the pre-groove information in the spiral of an optical disc, starts of segments ca not be detected instantaneously, since a laser beam needs to read a minimum length of the pre-groove information, e.g. read at least ⅓ segment (pre-defined in the spiral of an optical disc) to get the position information of the laser beam when dealing, as an example, with the Blu-ray Disc standard. Indeed, with such a standard, a segment (the segment is pre-defined in the spiral of a Blu-ray Disc; after recording, the segment will be a RUB (recording unit block)) is equivalent in length to 3 ADIP (Address In Pre-groove) words. If less than a full length ADIP word is scanned (i.e. less than ⅓ of a segment), the start of a current segment cannot be detected, so the recording can only be started from a next start of segment. That is to say, the laser beam has to wait a longer time to start recording.

FIG. 1 is a schematic diagram illustrating three continuous segments (S1, S2, S3) on an optical disc, each segment comprising 3 ADIP words (ADIP1, ADIP2, ADIP3).

It shows a laser beam B located inside the word ADIP3 of segment S1, meaning that the distance between the current position of laser beam B and the Start_S2 of the following segment S2 is less than the length of one ADIP word. As a consequence, the position on the optical disc of segment S1 cannot be detected, so that the recording cannot be started at the start of the following segment S2. The laser is thus obliged to scan at least one full ADIP word of the following segment S2 for determining the position of segment S2 on the optical disc. The data recording by laser beam B can thus only be started at the Start_S3 of segment S3, meaning that the laser beam B is inactive throughout segment S2. The process of recording is thus not optimal.

OBJECT AND SUMMARY OF THE INVENTION

It is an object of the invention to provide an improved method and system for recording data by a plurality of laser beams on an optical disc.

The method of recording data by a plurality of laser beams on an optical disc comprises segments each being identified by a synchronization pattern. The plurality of laser beams comprises at least a first laser beam having a first position on said optical disc for recording/reading data on a first segment, and a second laser beam having a second position on said optical disc for recording data on a second segment. The method comprising the steps of:
   calculating said second position from said first position and the relative distance between said first and second laser beams,
   detecting a synchronization pattern by said second laser beam, and
   starting to record data with said second laser beam on the basis of said second position and said detected synchronization pattern.

This method allows to quickly detect starts of segments, so that the data recording done by each laser beam is optimal, resulting in increasing the recording speed.

The invention also proposes a system comprising processing means for implementing the various steps of said method.

BRIEF DESCRIPTION OF THE DRAWINGS

These and other aspects of the method and system for recording data on an optical disc, according to the invention will become apparent from and will be elucidated with respect to the implementations and embodiments described hereinafter and with reference to the accompanying drawings, wherein.

Like reference numerals are used to denote similar parts throughout the figures.

DETAILED DESCRIPTION OF THE INVENTION

Figure 2:
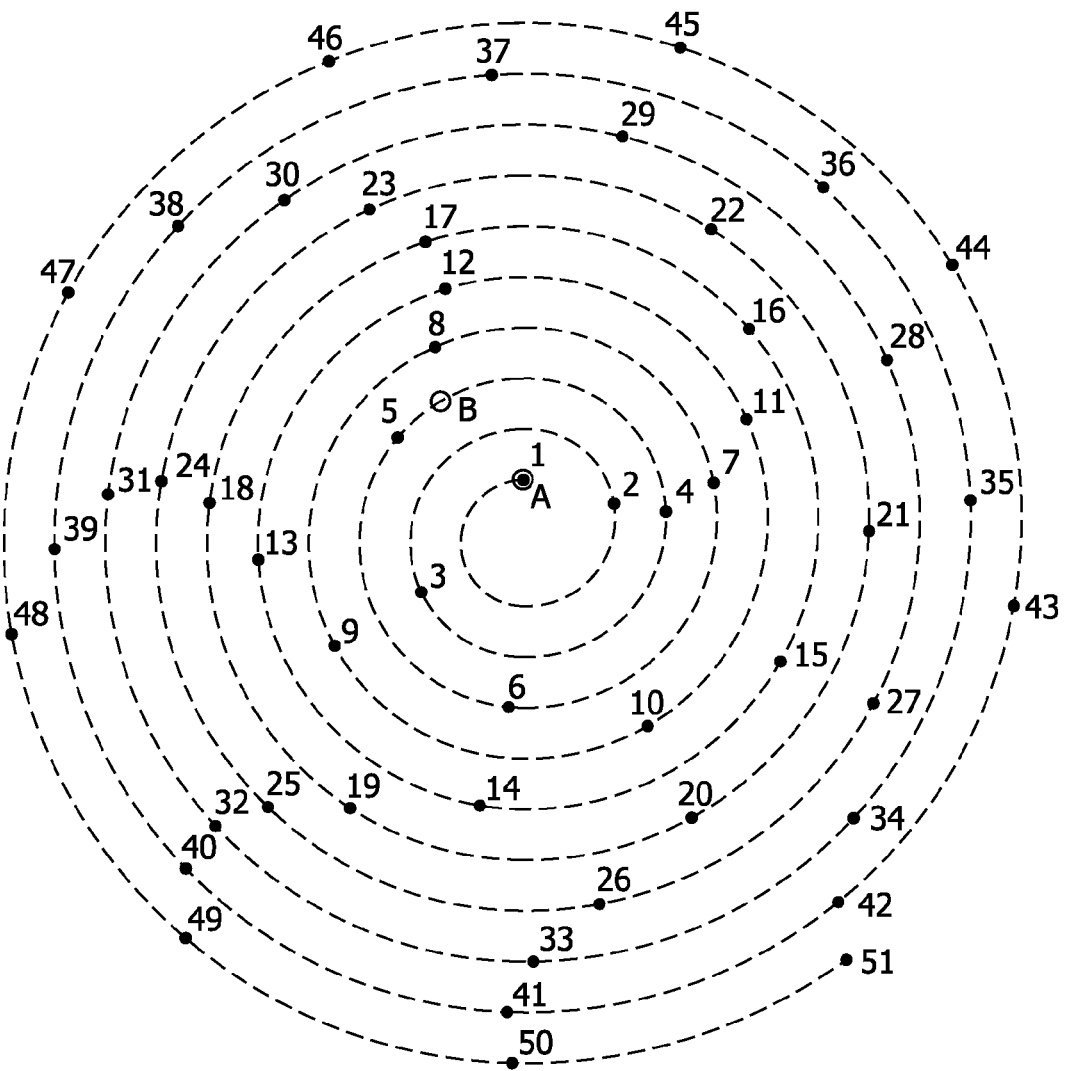
FIG. 2 illustrates by a first example two laser beams A and B for recording data on an optical disc in parallel.

FIG. 2 illustrates by a first example two laser beams A and B for recording data on an optical disc in parallel.

The initial position of the laser beam A is located at the start of segment 1, and the initial position of laser beam B is located somewhere inside segment 4.

The laser beam A being positioned at a start of segment, the laser beam A can start recording data from the start of segment 1.

The laser beam B being located inside segment 4, and the distance between the position of the laser beam B and the start of segment 5 being less than ⅓ of segment 4, the start of the segment 5 can be detected based on the position of laser beam A and relative distance between the positions of the laser beam A and laser beam B, and a synchronization pattern detected by the laser beam B, the synchronization corresponding to a known word previously stored in the structure of the optical disc and acting as a flag.

As a result, according to the invention, the laser beam B can start recording from the start of the segment 5, i.e. from the start of the next start of segment.

Figure 3:
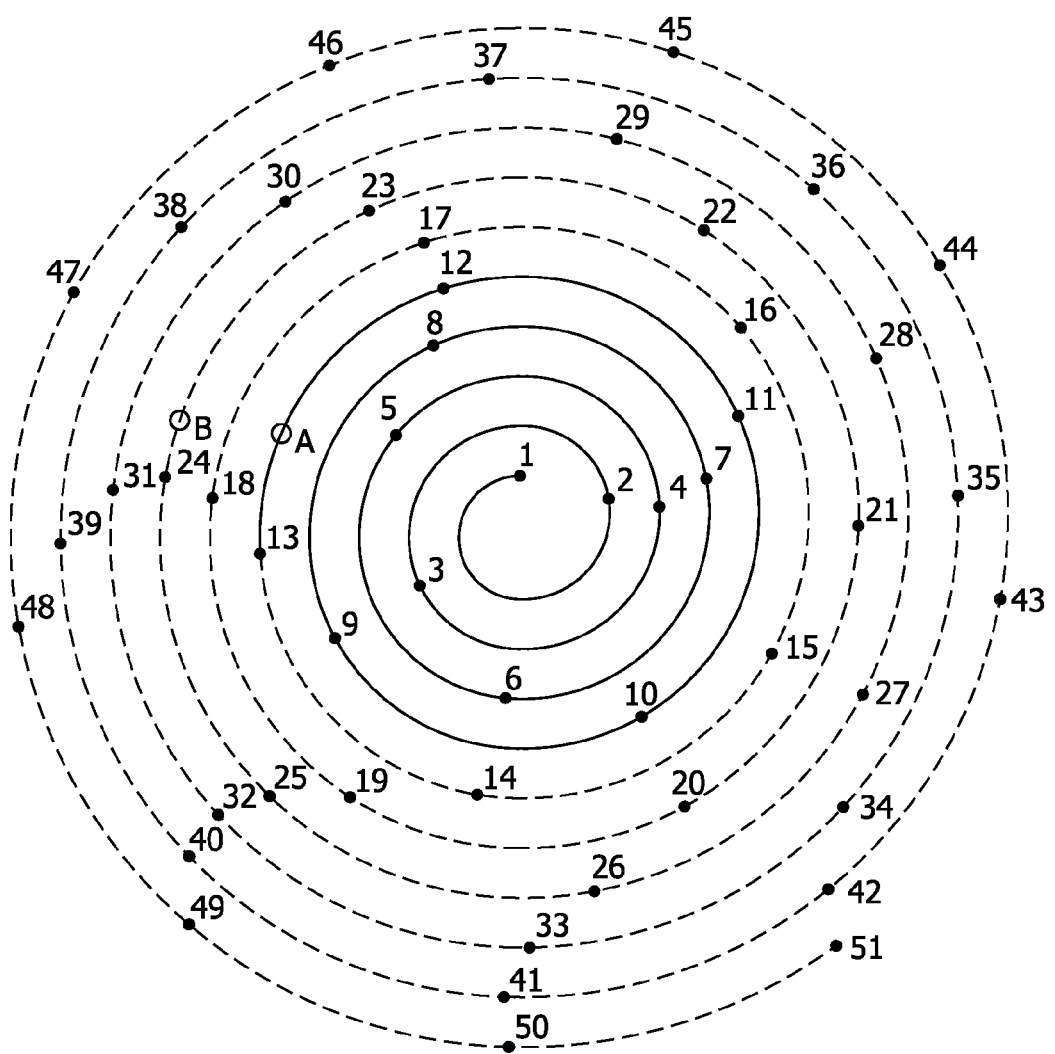
FIG. 3 illustrates by a second example two laser beams A and B for recording data on an optical disc in parallel.

FIG. 3 illustrates by a second example two laser beams A and B for recording data on an optical disc in parallel.

It shows a laser beam A located inside the segment 12 that has data previously recorded by laser beam B, and the position of laser beam A can be known from the data information recorded on the optical disc.

The laser beam B is located inside segment 23, and the start of the segment 23 can also be detected based on the position of laser beam A and relative distance between the positions of the laser beam A and laser beam B, and a synchronization pattern detected by laser beam B, the synchronization corresponding to a known word previously stored in the structure of the optical disc and acting as a flag.

As a result, according to the invention, the laser beam B can start recording from the start of the segment 23, i.e. from the start of the next start of segment.

Figure 4:
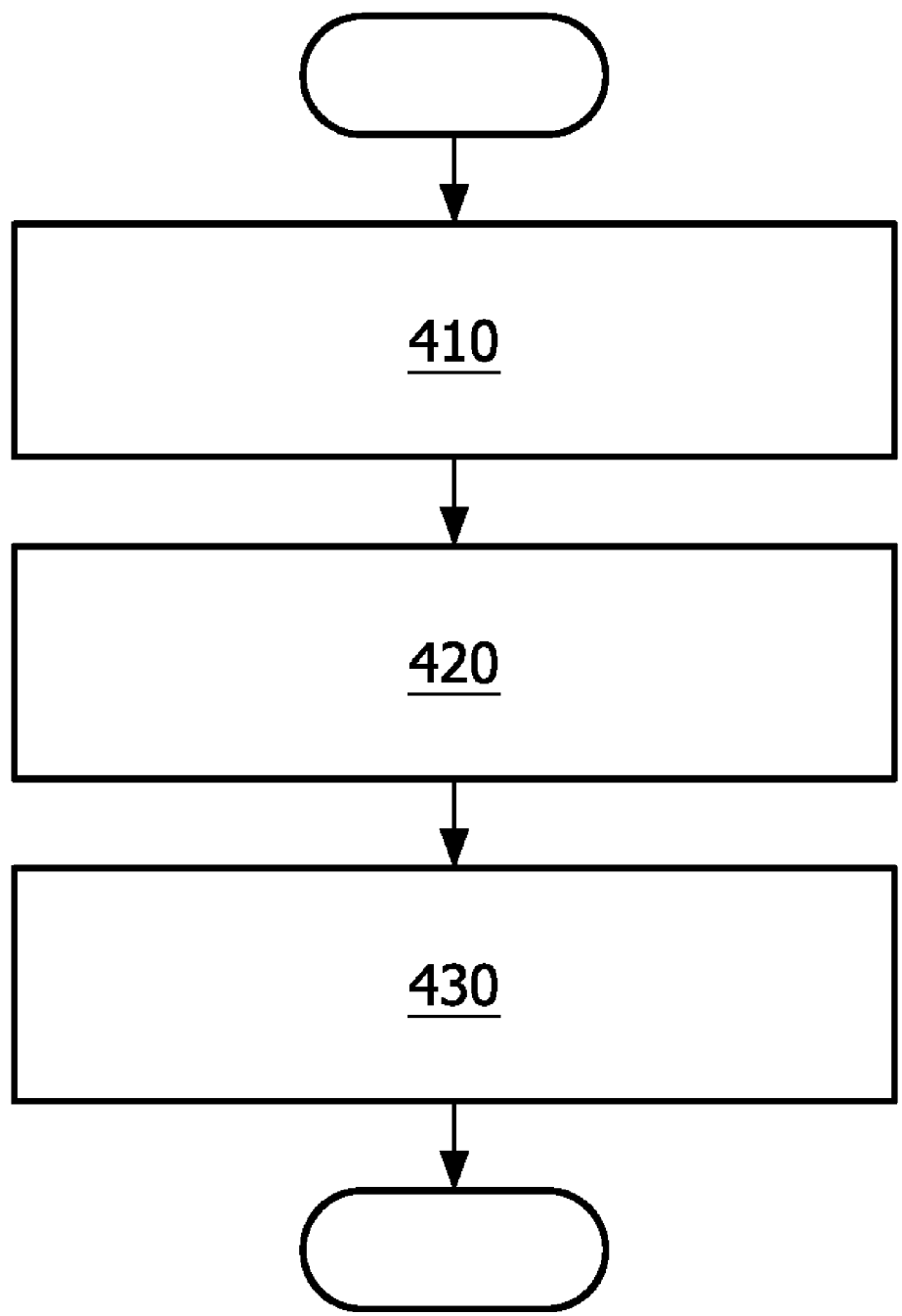
FIG. 4 is a flow chart depicting the method of recording data on an optical disc according to the invention.

FIG. 4 is a flow chart depicting the method of recording data on an optical disc according to the invention.

The method of recording data by a plurality of laser beams on an optical disc that comprises segments each identified by a synchronization pattern, and said plurality of laser beams comprising at least a first laser beam having a first position on said optical disc for recording/reading data on a first segment and a second laser beam having a second position on said optical disc for recording data on a second segment, said method comprising the steps of:

- calculating (410) said second position from said first position and the relative distance between said first and second laser beams. The first position of the first laser beam on the optical disc can be obtained from pre-groove information or data information previously recorded by other laser beam.
- detecting (420) a synchronization pattern by said second laser beam. The relative distance corresponds to an angular difference or a radial difference between said first and second laser beams.
- starting (430) to record data with said second laser beam on the basis of said second position and said detected synchronization pattern.

Figure 1:
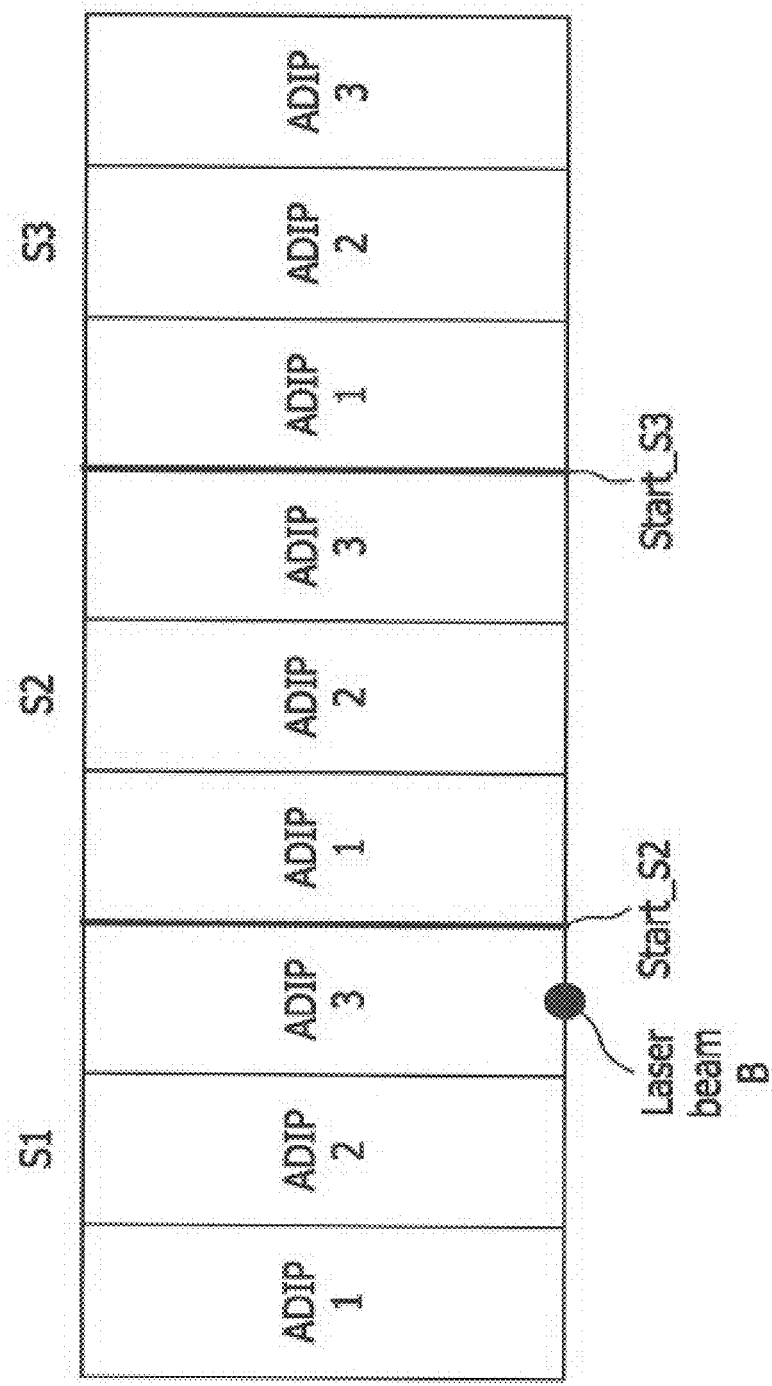
FIG. 1 is a schematic diagram illustrating three continuous data segments on an optical disc.

Coming back to FIG. 1, a method according to the invention can detect the start_S2 of segment S2 for the laser beam B, and not from the start_S3 of segment S3 as in the prior art. In other words, laser beam B can start recording earlier, from the closest data segment.

The step of calculating (410) can be implemented by an equation derived from the spiral structure pre-defined on an optical disc.

A formula is started with that describes a spiral on an optical disc, which can be expressed in polar coordinates as the equation below:

$$r(\theta) = r_0 + T_p \frac{\theta}{2\pi} \quad \text{(Equation 1)}$$

wherein r is the radius of a position on the spiral of the optical disc,

θ is the angle of the position on the spiral of the optical disc, $r_0$ is a radius of the start position of the spiral of the optical disc, $T_P$ is the track pitch.

Then the position located at the spiral of the optical disc is expressed as:

$$l(\theta) = \int_0^\theta r(\theta') d\theta' = r_0 \theta + \frac{T_p}{4\pi} \theta^2 \quad \text{(Equation 2)}$$

wherein l(θ) is the spiral length calculated from the start of the spiral track till the position of the first laser beam at angle θ.

If the position of the first laser beam is known, then the position of the second laser beam can be calculated as follows:

$$l(l_1, \Delta\theta) = l_1 + \frac{\Delta\theta^2 T_p}{4\pi} + \Delta\theta \sqrt{r_0^2 + \frac{l_1 T_p}{\pi}} \quad \text{(Equation 3)}$$

wherein Δθ is the angle difference between a position of a second laser beam to be calculated and the position of the first laser beam.

For example, Δθ is not far away from the value of n×2π, where n is the distance between the positions in terms of number of spiral tracks on the optical disc.

Equation 3 can further be approximated by getting rid of the square root operator. Because the track pitch is relatively small, the term $n^2 \pi T_P$ can be neglected, resulting in the following equation:

$$l(l_1, \Delta\theta) \approx l_1 + n^2 \pi T_p + \Delta\theta \sqrt{r_0^2 + \frac{l_1 T_p}{\pi}} \approx \quad \text{(Equation 4)}$$

$$l_1 + \Delta\theta \sqrt{r_0^2 + \frac{l_1 T_p}{\pi}}$$

In some optical drives, the position of the sledge is precisely monitored and controlled. Therefore, parameter $r_1$ can be used for calculating the position l of a second laser beam as follows:

$$l(l_1, r_1, \Delta\theta) \approx l_1 + r_1 \Delta\theta \quad \text{(Equation 5)}$$

wherein l is the position of the second laser beam located on an optical disc, $r_1$ is the radius of the position of the first laser beam located on an optical disc, $l_1$ is the spiral length of the position of the first laser beam, Δθ is the angular distance between the position of the first laser beam and the position of a second laser beam.

Equation 5 can thus be used to calculate the position of the second laser beam located on the optical disc.

Figure 5:
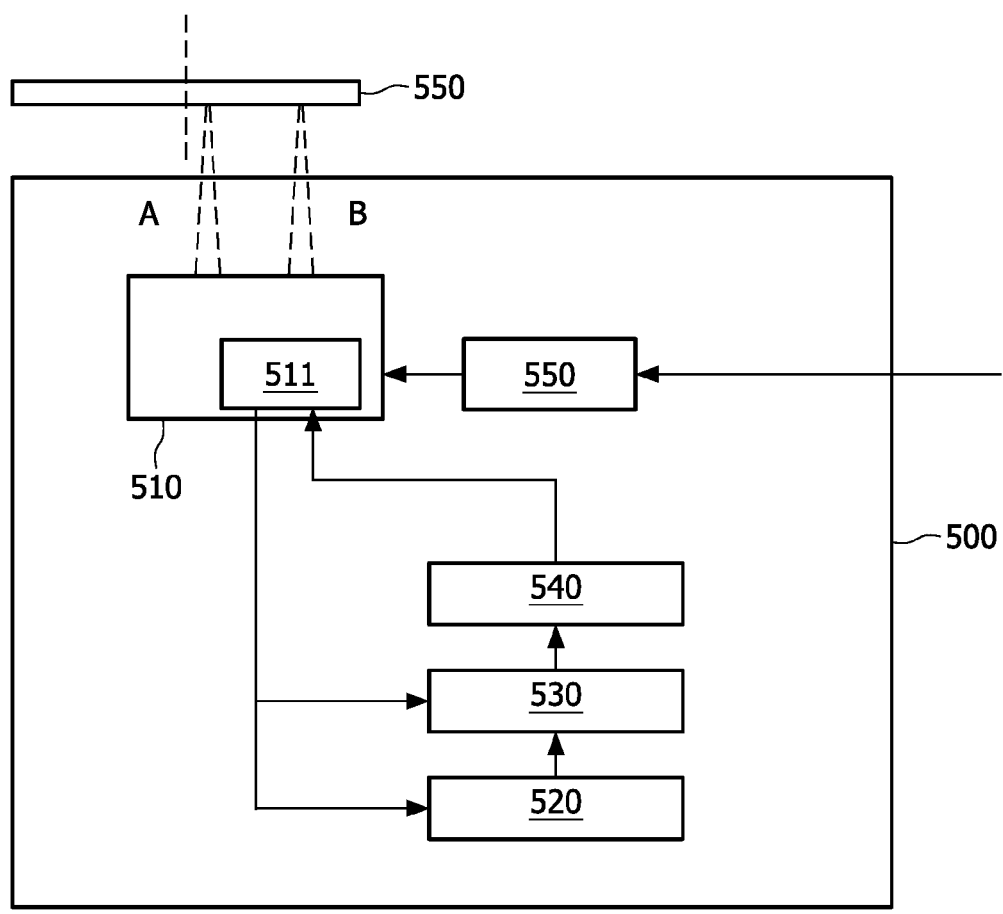
FIG. 5 depicts a system for implementing the method according to the invention.

FIG. 5 depicts a system 500 for implementing the method according to the invention, for recording data by a plurality of laser beams (A, B) on an optical disc 560 that comprises segments each identified by a synchronization pattern, said plurality of laser beams (A, B) comprising at least a first laser beam A having a first position on said optical disc 560 for recording/reading data on a first segment, and a second laser beam B having a second position on said optical disc 560 for recording data on a second segment, said system comprising the means for:

calculating (520) said second position from said first position and the relative distance between said first laser beam and said second laser beam. The first position of the first laser beam on the optical disc can be obtained from pre-groove information or data information previously recorded by other laser beams.

detecting (530) a synchronization pattern by said second laser beam. The relative distance corresponds to an angular difference or a radial difference between said first and second laser beams.

controlling (540) said second laser beam to start recording data on the basis of said second position and said detected synchronization pattern.

The system 500 further comprises an optical pickup unit 510 for recording/reading data on the optical disc 560, and a data encoder 550 for encoding data to be recorded on the optical disc 560.

The optical pickup unit 510 is used for reading and retrieving pre-groove information or data information previously recorded on the optical disc 560, and generates such signals to the calculating means 520 and the detecting means 530. The optical pickup unit 510 comprises a laser source 511 for generating laser beams (A, B) to record data on the optical disc 560. The recording process of the laser source 511 is controlled by the controlling means 540.

All signal processing functionalities of system 500 may for example be implemented by a signal processor executing code instructions of firmware or software stored in a memory.

This system may advantageously be integrated into an apparatus (e.g. computer disc drive, standalone system) for recording data on an optical disc by a plurality of laser beams.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The use of the words first, second and third, etcetera do not indicate any ordering. These words are to be interpreted as names.

The invention claimed is:

1. A method of recording data by a plurality of laser beams on an optical disc, said optical disc comprising segments which are each identified by a synchronization pattern, said plurality of laser beams comprising at least a first laser beam which has a first position on said optical disc for recording/reading data on a first segment, and a second laser beam which has a second position on said optical disc for recording data on a second segment, said method comprising the steps of:

calculating (410) said second position from said first position and the relative distance between said first laser beam and said second laser beam, detecting (420) a synchronization pattern by said second laser beam in a next segment closest to the position of the second laser, and starting (430) to record data with said second laser beam on the basis of said second position and said detected synchronization pattern closest to the position of the second laser.

2. A method as claimed in claim 1, wherein said relative distance corresponds to an angular difference or a radial difference between said first laser beam and said second laser beam.

3. A system for recording data by a plurality of laser beams on an optical disc comprising segments which are each identified by a synchronization pattern, said plurality of laser beams comprising at least a first laser beam which has a first position on said optical disc for recording/reading data on a first segment, and a second laser beam which has a second position on said optical disc for recording data on a second segment, said system comprising the means for:

calculating (520) said second position from said first position and the relative distance between said first laser beam and said second laser beam, detecting (530) a synchronization pattern by said second laser beam in a next segment closest to the position of the second laser, and controlling (540) said second laser beam to start recording data on the basis of said second position and said detected synchronization pattern closest to the position of the second laser.

4. A system as claimed in claim 3, wherein said relative distance corresponds to an angular difference or a radial difference between said first and second laser beams.

5. Apparatus for recording data on an optical disc by a plurality of laser beams, said apparatus comprising a system for recording data by a plurality of laser beams on an optical disc comprising segments which are each identified by a synchronization pattern, said plurality of laser beams comprising at least a first laser beam which has a first position on said optical disc for recording/reading data on a first segment, and a second laser beam which has a second position on said optical disc for recording data on a second segment, said system comprising the means for:

calculating (520) said second position from said first position and the relative distance between said first laser beam and said second laser beam, detecting (530) a synchronization pattern by said second laser beam in a next segment closest to the position of the second laser, and controlling (540) said second laser beam to start recording data on the basis of said second position and said detected synchronization pattern closest to the position of the second laser.

* * * * *